Oct. 24, 1933.  T. C. McBRIDE  1,932,114
FEED WATER HEATER
Filed July 30, 1930  6 Sheets-Sheet 1

Thos. C. McBride
INVENTOR
BY
Rolee Meyer
ATTORNEY

Oct. 24, 1933.    T. C. McBRIDE    1,932,114
FEED WATER HEATER
Filed July 30, 1930    6 Sheets-Sheet 4

Oct. 24, 1933.                T. C. McBRIDE                1,932,114
                              FEED WATER HEATER
                           Filed July 30, 1930           6 Sheets-Sheet 5

THOS. C. McBRIDE.
INVENTOR
ATTORNEY

Patented Oct. 24, 1933

1,932,114

UNITED STATES PATENT OFFICE 1,932,114

FEED WATER HEATER

Thomas C. McBride, Germantown, Pa., assignor to Worthington Pump and Machinery Corporation, New York, N. Y., a corporation of Virginia Application July 30, 1930. Serial No. 471,612

12 Claims. (Cl. 261—34)

This invention relates to feed water heaters and more specifically to heaters for use on locomotives, such heaters utilizing part of the exhaust steam from the cylinders of the locomotives to heat the boiler feed water.

Among the objects of the present invention are the provision of a feed water heater of the open or direct contact type in which exhaust steam from the locomotive and from the pump structure of the heater comes into direct contact with cold water sprayed into the heater, thereby heating the water and recovering the condensate from the exhaust steam for return to the boiler; a heater which is simple in construction, efficient in operation and is of compact size enabling it to meet the space and weight limitations of a locomotive and one with a minimum number of parts within the heater of such type as to require the heater to be opened for attention.

Another object of the invention is to provide in a feed water heater structure, a feed pump of simple construction which can be conveniently attached to a locomotive and which embodies a special provision to equalize the amounts of cold and hot water pumped regardless of wide variations in the speed of the pump and further to provide a complete feed water heater apparatus which is of such a character that it may be placed on a locomotive without detracting from the appearance of the locomotive and with its weight advantageously distributed.

More specifically, the present invention comprises a feed water heater structure embodying a heater proper, constructed and designed to be placed on or partly in the smoke box of a locomotive either in front of or behind the stack and one in which the pump consists of a steam cylinder that operates a cold water supply pump cylinder and hot water or boiler feed pump cylinder. The pump cylinders are preferably of direct acting displacement type and deliver to and take from the heater proper the predetermined portions of water necessary to supply the desired slight excess of water in the heater with proper allowance for the condensate from the exhaust steam used in the heating.

The heater proper embodies means whereby the level of water in the heater may be regulated, such level being determined by an overflow outlet or passage which opens into the heater at approximately the desired level of water therein. This overflow outlet serves also as an exhaust or outlet for the air which collects in the heater, permitting such air to pass out of the heater with the slight excess of water provided. The excess water and the air from the heater are delivered to a suitable separating chamber in which the air rises to the top of the chamber and passes out through an air vent which is always open to atmosphere, while the excess water falls to the bottom of the chamber and under control of a suitable bucket or float, is delivered to the cold water pump cylinder or to the cold water suction pipe through a suitable return valve.

With these and other objects in view, as may appear from the accompanying specification, the invention consists of various features of construction and combination of parts, which will be first described in connection with the accompanying drawings, showing a feed water heater of the preferred form embodying the invention, and the features forming the invention will be specifically pointed out in the claims.

Referring more particularly to the drawings, the feed water heater structure is composed of the feed water heater 1, to which cold water is pumped from the tender (not shown) of a locomotive and hot water pumped therefrom to the boiler of the locomotive by the pump structure 2, while excess water from the heater 1 is returned to the pump structure 2 through a separator 3 in which separator the air is separated from the water and allowed to escape to the atmosphere.

Figures 1, 12:
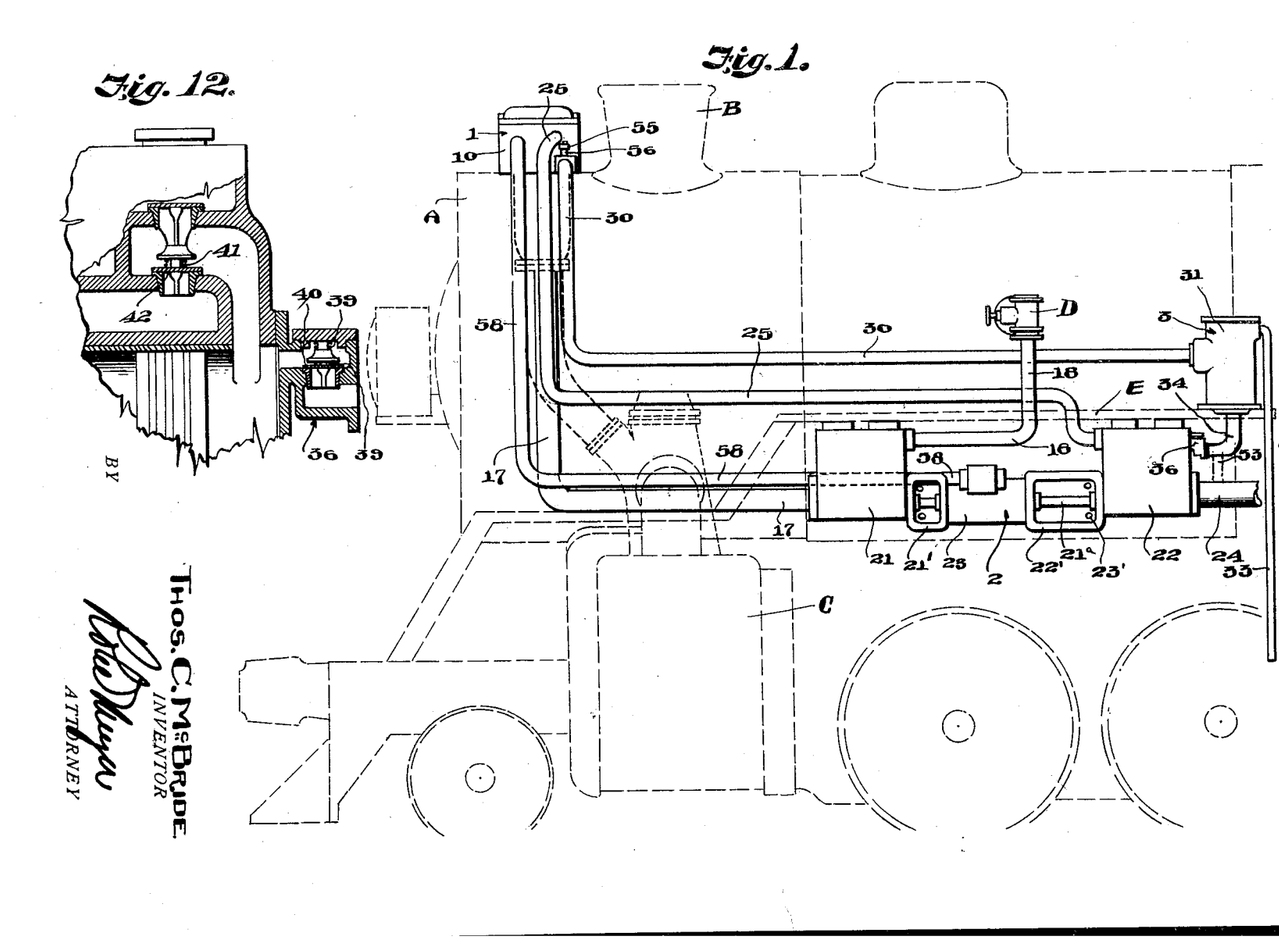
Fig. 1 is a view in side elevation of the improved feed water heater structure showing it applied to a locomotive.
Fig. 12 is a detailed view partly in section of the cold water pump.
Figure 2:
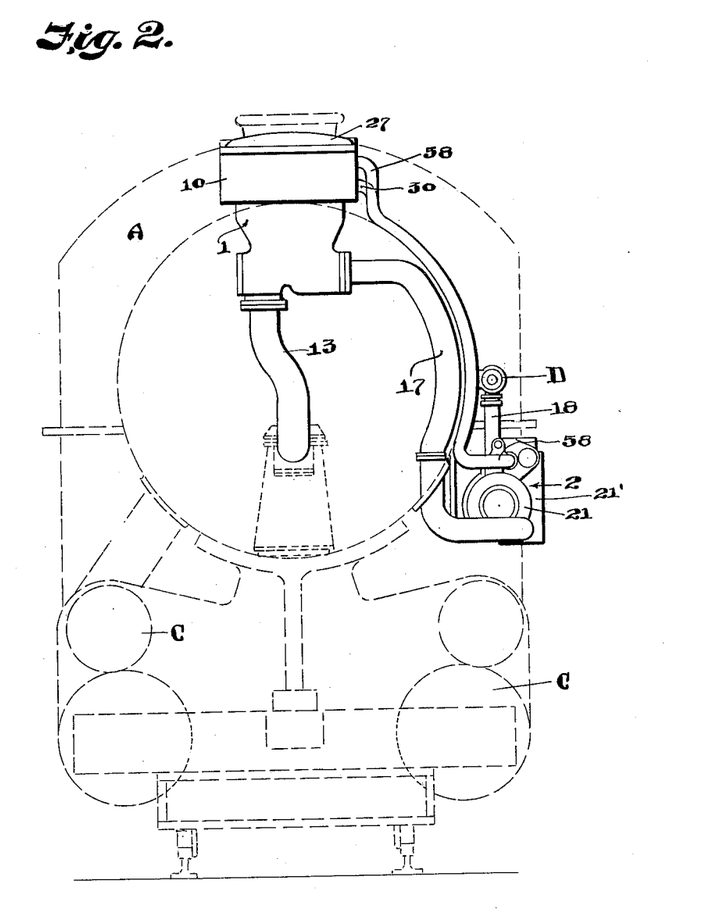
Fig. 2 is an end elevation of the improved feed water heater structure showing it applied to a locomotive.
Figure 3:
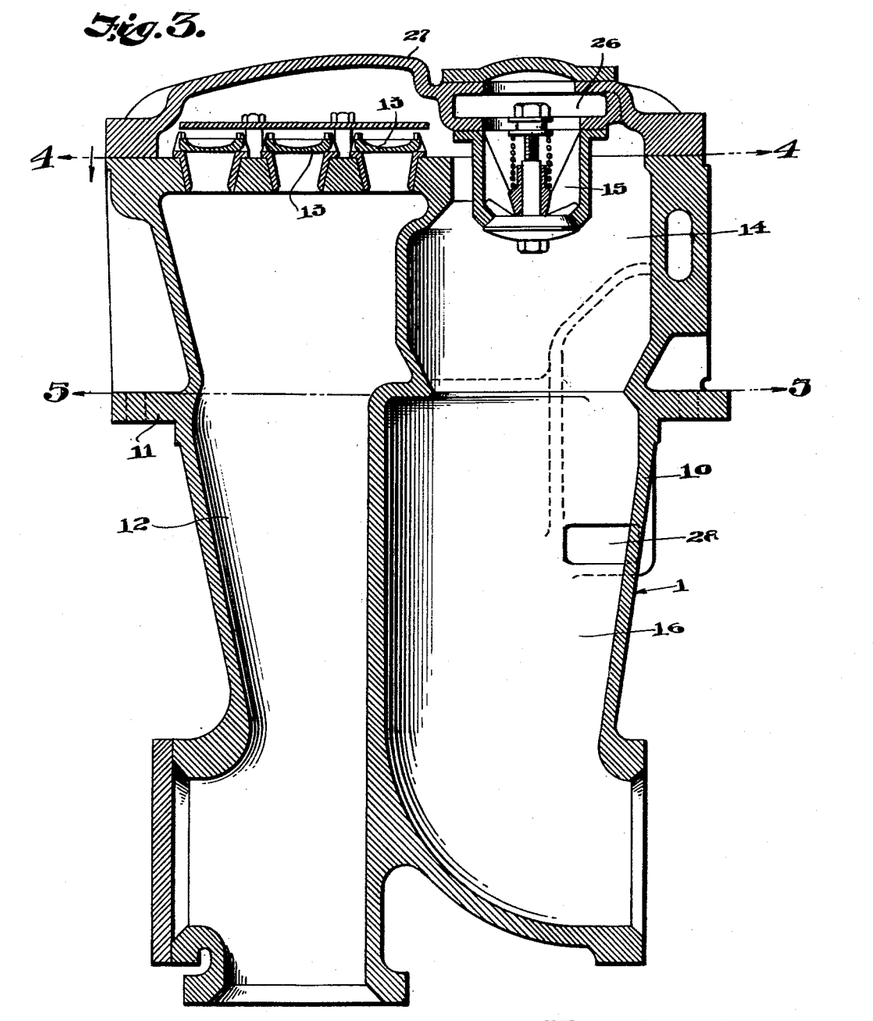
Fig. 3 is a vertical section through the heater proper.
Figure 4:
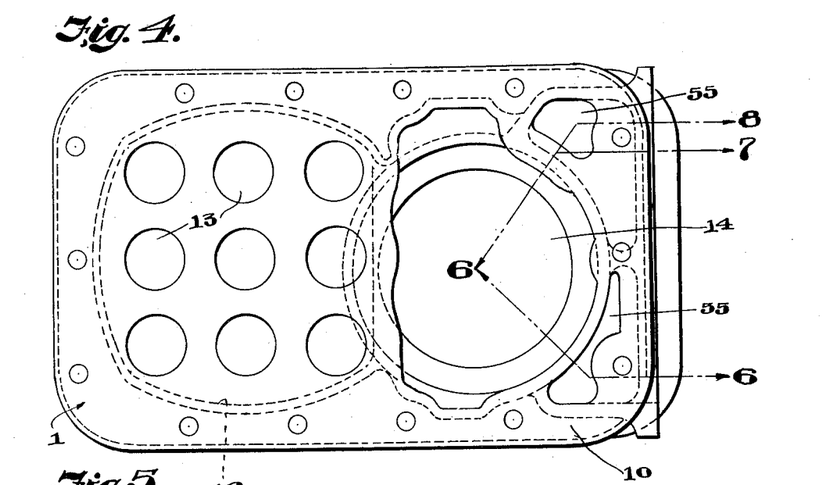
Fig. 4 is a horizontal section through the heater taken on the line 4—4 of Fig. 3.
Figure 5:
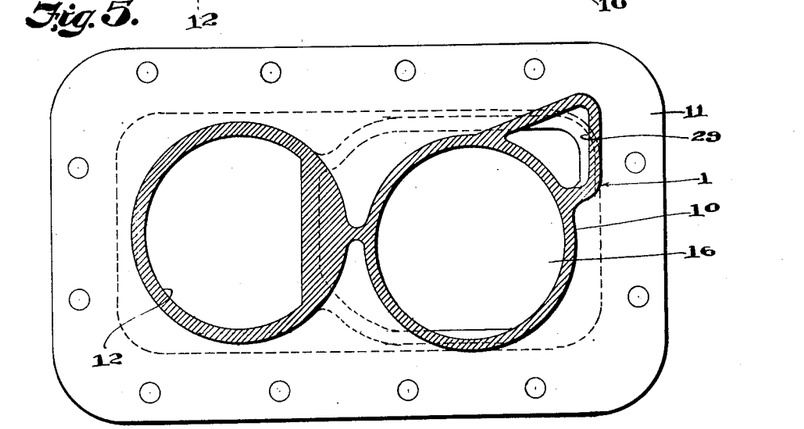
Fig. 5 is a horizontal section through the heater taken on the line 5—5 of Fig. 3.
Figure 6:
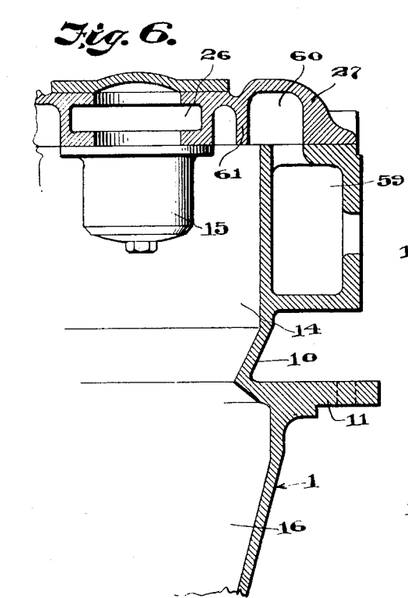
Fig. 6 is a fragmentary vertical section through the heater taken on the line 6—6 of Fig. 4.
Figure 7:
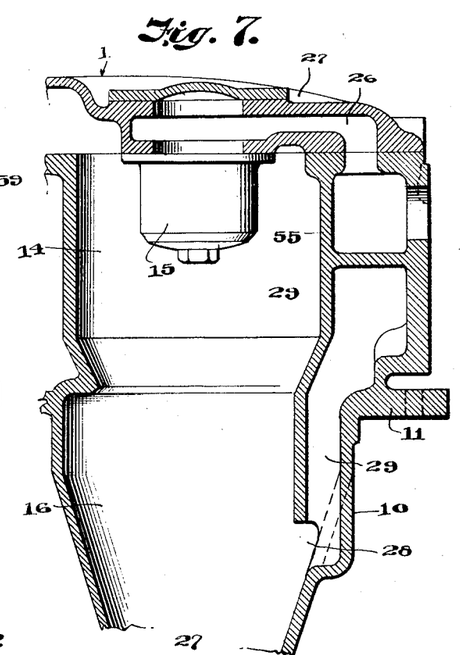
Fig. 7 is a fragmentary vertical section through the heater taken on the line 6—7 of Fig. 4 of the drawings.

As shown particularly in Figs. 1 and 2 of the drawings, these various units of the complete feed water heater installation are of such size and are so designed that they may be conveniently placed upon a locomotive without detracting from the appearance of the locomotive and with the weight of the feed water heater installation advantageously distributed.

Referring particularly to the feed water heater 1, this heater comprises a housing 10 having attaching flanges 11 thereon intermediate its top and bottom so that the heater may be partly inserted into the smoke box of a locomotive, indicated at A, either in front of the stack as shown in Fig. 1 of the drawings or in the rear of the stack if it is so desired. The heater is inserted into the smoke box with only a sufficient portion of its body or housing projecting above the top of the smoke box to permit connection thereto of the smaller pipes required in the feed water heater installation.

The housing or box 10 has a steam inlet passage 12 therein, which is connected by a suitable pipe as indicated at 13 with the exhaust outlet from the cylinders C of the locomotive so that a part of the exhaust steam from the cylinders C will enter the passage or chamber 12 in the heater body 10 and pass through the steam check valves 13 into the heating chamber 14, where the steam will contact with the cold water delivered to the heater by the pump structure 2. The cold water is sprayed into the heating chamber 14 by means of a suitable sprayer 15 of any approved form so as to permit maximum contact of the water and steam for heating the water and condensing the steam. The heated water and the condensate falls from the heating chamber 14 into the hot water chamber 16 of the feed water heater from which it is drawn by the pump structure 2 through the hot water outlet pipe 17. The hot water drawn from the chamber 16 of the heater structure 1 is delivered by the pump structure 2 to the boiler check D through the pipe 18 and consequently into the boiler of the locomotive.

The pump structure 2 comprises the hot water pump cylinder 21 which withdraws heated water from the heater 1 and delivers it to the boiler of the locomotive, cold water cylinder 22 and the steam cylinder 23. The steam cylinder 23 of the pumping unit 2 is connected to the cold pump or cold water cylinder 22 by the housing 22' and to the hot water pump or cylinder 21 by the housing 21'. The length of the opening shown in the front or outer side of the housing 22' is so arranged that the removal of the piston (not shown) of the hot water pump 21 from the piston rod 21a with the steam cylinder head slid along the rod 21a within the housing 22', permits the piston (not shown) of the steam cylinder 23 to be pushed out into the housing 22' for inspection and replacement of the piston rings of the steam piston. Both housings 21' and 22 are provided with front or outer openings of sufficient size to permit removal of cylinder heads and the steam piston when necessary and these housings are cast integral with the steam cylinder 23, thus securing accurate alignment in machining and also accurate and permanent location of the four bolt holes 23' and the four feet 23a which are used to attach the pumping unit to the locomotive.

The pumping unit or pump 2 as clearly shown in Figs. 1 and 2 of the drawings, is independent of the heater proper 1 and is placed at any convenient location on the locomotive but preferably on the side of the locomotive beneath the running board E where the various connections to it will be direct and short.

The cold water cylinder 22 of the pumping unit 2 draws the cold water from the tender (not shown) of the locomotive through the cold water pipe 24 and delivers it through the pipe 25 into the cold water passage 26 formed in the cover 27 of the feed water heater 1. The passage 26 delivers the cold water to the sprayer 15.

The heated water and condensate accumulates in the hot water chamber 16 of the feed water heater until it reaches the lower open end 28 of the overflow passage 29 and further accumulation of water in the hot water chamber 16 causes the excess water to overflow through the overflow passage 29, which overflow passage also serves as an outlet for air from the feed water heater. There is always a slight pressure of exhaust steam in the heater when the pumping unit is in operation which pressure serves to force the air and excess water out of the heater through the passage 29 and from the passage 29 through the pipe 30 to the separator 3.

Figure 9:
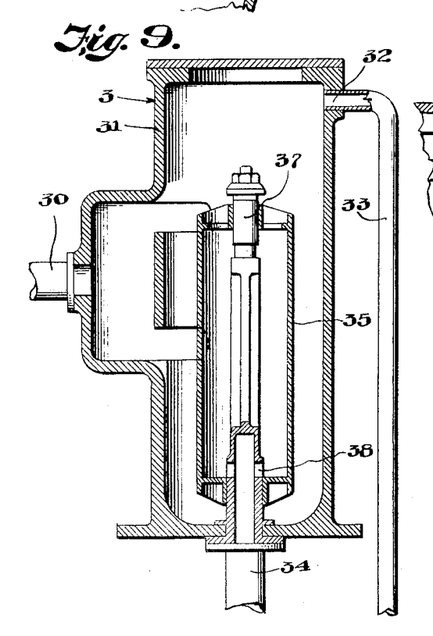
Fig. 9 is a vertical section through the separator embodied in the feed water heater structure.

Air and excess water from the heater enters the body 31 of the separator 3 through the pipe 30. The air rises to the top of the chamber or interior of the body of the separator and passes outwardly through the air vent 32 to the atmosphere. In Figs. 1 and 9 of the drawings, a pipe 33 is shown connected to the air vent 32 but this pipe may be dispensed with if it is so desired without departing from the spirit of this invention.

The water falls to the bottom of the chamber within the body 31 and passes out through the connection 34, under control of the float or bucket 35 to the return valve 36. The bucket or float 35 is free to rise and fall on the stem 37 which is provided with openings 38, having communication with the pipe or connection 34. When the water in the body 31 of the separator 3 reaches a predetermined level, the excess water overflows into the bucket 35 through its open top and the bucket sinks and uncovers the openings 38 as shown in Fig. 9 of the drawings, which allows the excess water to pass through the openings 38 and out through the connection 34 to the cold water pump 22 or to the cold water suction pipe 24 if it is so desired.

When the excess of water has been pumped out of the separator 3 and the bucket 35, the bucket rises, due to its flotation in the water in the chamber, closes the openings 38 and cuts off the flow of water to the return valve 36 until the water level in the separator 3 again rises to a sufficient height to flood the float or bucket 35 and causes it to sink and open the ports 38.

The return valve 36 which is more specifically shown in Fig. 12 of the drawings, is substantially an additional suction valve of the cold water pump cylinder 22 and it is also in effect, a non-return valve in the pipe 34, which permits water to enter the pump cylinder from the separator 3 when the piston is moving away from the valve, but prevents the return of water and compels its discharge through the pump discharge when the pump piston is moving towards the return valve.

The springs 39 which serve to seat the valve disc 40 in the return valve structure 36 and the springs 41 on the suction valve 42 of the pump, are selected of such tension that return of water from the separator is favored as compared to suction of cold water from the tender through the pipe 24 and any returned water entering the cold water pump through the return valve 36, results in a corresponding reduction of water taken from the tender.

The above described structure constitutes a complete feed water heating and boiler feeding system. The pumping unit 2 is started, stopped or operated at any particular speed necessary to meet the requirements of the boiler of a locomotive under control of a throttle valve (not shown). The operation of the cold water and hot water pump cylinders of the pumping unit from the same steam cylinder, secures a supply of cold water to the heater that is always quite closely proportional to the amount of hot water taken from the heater but the amount of excess steam condensed in the heater during the heating of the cold water varies to a considerable extent with the varying temperatures of the cold water and the pressures of the exhaust steam. There is therefore a considerable variation in the amount of exhaust steam condensed in the heater and consequently in the amount of condensate added to the volume of water entering the heater. This latter variation is taken care of by an overflow of water from the heater through the passage 29, separator 3 and return valve 36, with the amount of cold water taken from the tender reduced by the amount of water, including the condensate returned from the heater. Meantime, the air which tends to collect in the heater passes out through the pipe 30 and the vent 32 and incidentally the air is taken from the part of the heater 1 best suited to the heating effect desired because it is taken from the point farthest removed from the inlet for cold water and exhaust steam to the heating chamber 14.

However, difficulty sometimes arises in maintaining the proper proportions of cold water supplied to the heater 1 and hot water taken therefrom. This difficulty arises from the fact that the cold water pump 22 delivers against a low discharge pressure, whereas the hot water pump 21 delivers against a high discharge pressure, namely, the boiler pressure of the locomotive. Because of this condition, there is but little "slip" or leakage of the piston and pump valve of the cold water pump 22 whereas there is considerable "slip" in the hot water pump 21. The "slip" is best expressed in quantity as lost motions of the pump or strokes per minute of the pump equivalent to the rate of leakage of water through the parts of the pump.

The "slip" of the cold water pump is very small but to simplify a description of the problem involved might be assumed to be equivalent to one lost motion or one stroke per minute. At any speed below one stroke per minute, the cold water pump would not deliver any water to the heater 1. At any speed above one stroke per minute the pump would deliver an amount of water to the heater roughly equivalent to the volume displaced by the piston less the volume of one displacement per minute. The hot water pump might have a "slip" equivalent to four lost motions of four strokes per minute, taking no water from the heater at pump speeds of less than four strokes per minute and at higher speeds taking from the heater a volume of water equivalent to that indicated by the pump speed less four strokes per minute. At very slow speeds of the pump and particularly at the crawling speeds that result from leakage of the pump throttle valve or lubricator, this difference in "slip" of the two pumps may cause an overflow and waste of water from the air vent 32 because more excess water is supplied to the heater than can be taken care of by the return valve 36 of the cold water pump 22 at the very low speed of that pump.

As an illustration, it might be presumed that the pump was running at the rate of six strokes per minute either because of steam leakage through the throttle valve and lubricator (not shown) or a very slight opening of the pump throttle valve. Under these conditions and with the pump "slip" assumed above, the hot water pump cylinder would remove only two displacements of water per minute from the heater, whereas the cold water pump cylinder would deliver five displacements of water to the heater. The difference of three displacements of water per minute plus the condensate added to the cold water in the heater 1 would then have to be taken care of by the return valve 36 with the cold water pump cylinder running at but six strokes per minute and delivering the equivalent in water of five strokes per minute. Since but one return valve 36 is used, only alternate strokes of the cold water pump cylinder, handle the excess water returned from the heater and the equivalent of only two and one half displacements of the cold water pump cylinder per minute maximum could be returned to the heater, whereas the equivalent of five displacements per minute plus condensate is delivered to the heater 1.

Under these conditions, with five displacements of the cold pump going to the heater and two and one half displacements of the cold pump returned from the heater with only two displacements taken from the heater by the hot pump, there is a possibility of two much water in the heater and overflow and waste of water from the air vent.

Figure 10:
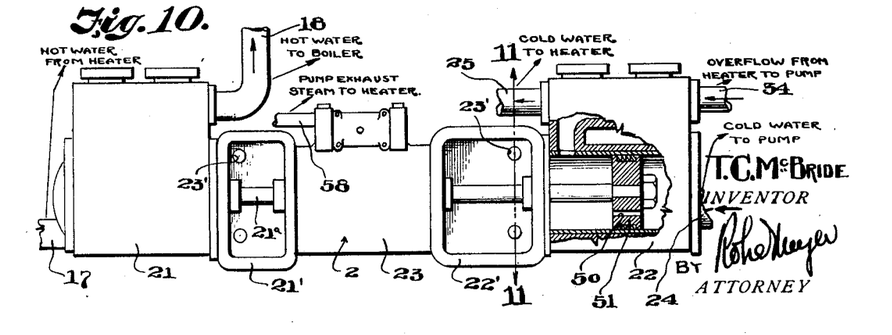
Fig. 10 is a view of the feed pump partly in side elevation and partly in section.

To overcome the condition described above, a deliberate leak in the cold water pump or bypass to the cold water pump is provided in the improved heater, which leak is equivalent to the difference in "slip" of the cold and hot water pumps, that is, equivalent to approximately three displacements per minute of the cold water pump. This deliberate leak in the cold water pump might take the form of a small hole 50 through the piston 51 (see Fig. 10 of the drawings), or, when the excess water that has overflowed from the heater is returned to the cold pump suction through the alternate pipe 53 (shown in dot and dash lines in Fig. 1) instead of the return valve, by a bypass 55 from the cold pump discharge 25 to the return pipe 30, which bypass may be either within or outside of the heater. The last mentioned arrangement serves another function which will be described later.

At certain times, particularly when the pressure of the exhaust steam in the heater 1 is quite low, it is desirable to accelerate the flow of excess water and air from within the heater, through the passage 29 in the interest of higher feed water temperatures. It is also of advantage to cool the water overflowing from the chamber 16 to the separator 3 and passing to the return valve 36 or cold water suction pipe through the alternate pipe 53, in order to secure better action of the return valve and to reduce steam discharge from the air vent 32 with the air.

Figure 8:
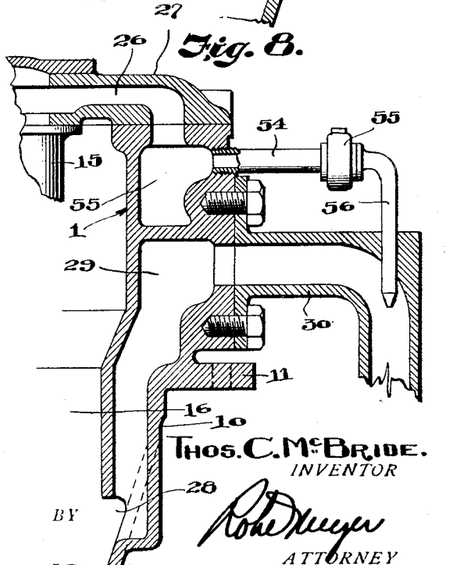
Fig. 8 is a fragmentary vertical section through the heater taken on the line 6—8 of Fig. 4 of the drawings.

An arrangement to secure these results is shown in Fig. 8 of the drawings, and comprises a connection 54 with the passage 55 in the heater body 1. The passage 55 establishes communication between the cold water supply pipe 25 and the passage 26 in the heater. Cold water passes through the connection or pipe 54, check valve 55 and cold water jet or nozzle 56 into the overflow pipe 30 in the direction of the separator 3. The cooling of the water and air in the pipe 30 by the cold water introduced into it through the jet 56 provides cooled water for the return valve 36 and insures better operation of that valve because it has only water to handle, and not a mixture of steam generated by the suction effect of the return valve and it also reduces the amount of steam discharged with the air from the air vent 32.

The exhaust check valves 13 of the feed water heaters of the general open or contact type described, are opened by the exhaust steam from the locomotive cylinders as it enters the heater. This exhaust steam reaches the heater in violent pulsations particularly at low speeds of the locomotive but there is some little flow of steam between pulsations tending to keep the check valve 13 open or nearly so and therefore subject to but little wear as far as this part of the supply of exhaust steam is concerned. However, the exhaust steam from the pumping unit 2, which is delivered to the heating chamber 14 through the pipe 58 also reaches the heater in violent pulsations and causes an instantaneous rise in the pressure of exhaust steam in the heater. Since it is admitted to the heating chamber 14 of the heater through the passage 59, it enters the heater on the opposite side of the check valve 13 from the side of the heater at which the locomotive exhaust steam enters, causing an instantaneous rise in pressure in the heater and violent closing of the exhaust check valves 13. This alternate closing of the exhaust check valves 13 by the exhaust from the steam cylinder 23 of the pump 2 and opening by the next impulse of exhaust steam from the locomotive cylinders, keeps these valves in continuous operation and subject to wear.

To overcome this condition the present improved heater is designed so that the exhaust steam from the steam cylinder 23 of the pump 2 reaches the passageway 59 and enters a compartment 60 in the cover 27 of the heater 1 and is directed in a broad stream against the spray of cold water entering the heating chamber 14 from the sprayer 15 by the partition 61. The deflecting or guiding of the pump exhaust steam against the incoming spray of cold water by the partition 61 causes the pump exhaust steam to be condensed before it can cause any appreciable increase in pressure in the heater and consequently the exhaust steam valves 13 remain at their open or nearly open position and the wear of the valves is materially reduced.

Figures 11, 13:
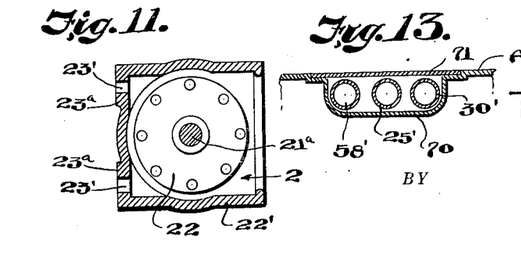
Fig. 11 is a vertical section through the pump structure taken on the line 11—11 of Fig. 10.
Fig. 13 is a fragmentary section through the smoke box of a locomotive showing a modified form of mounting certain of the pipes embodied in the feed water heater installation.
Figure 14:
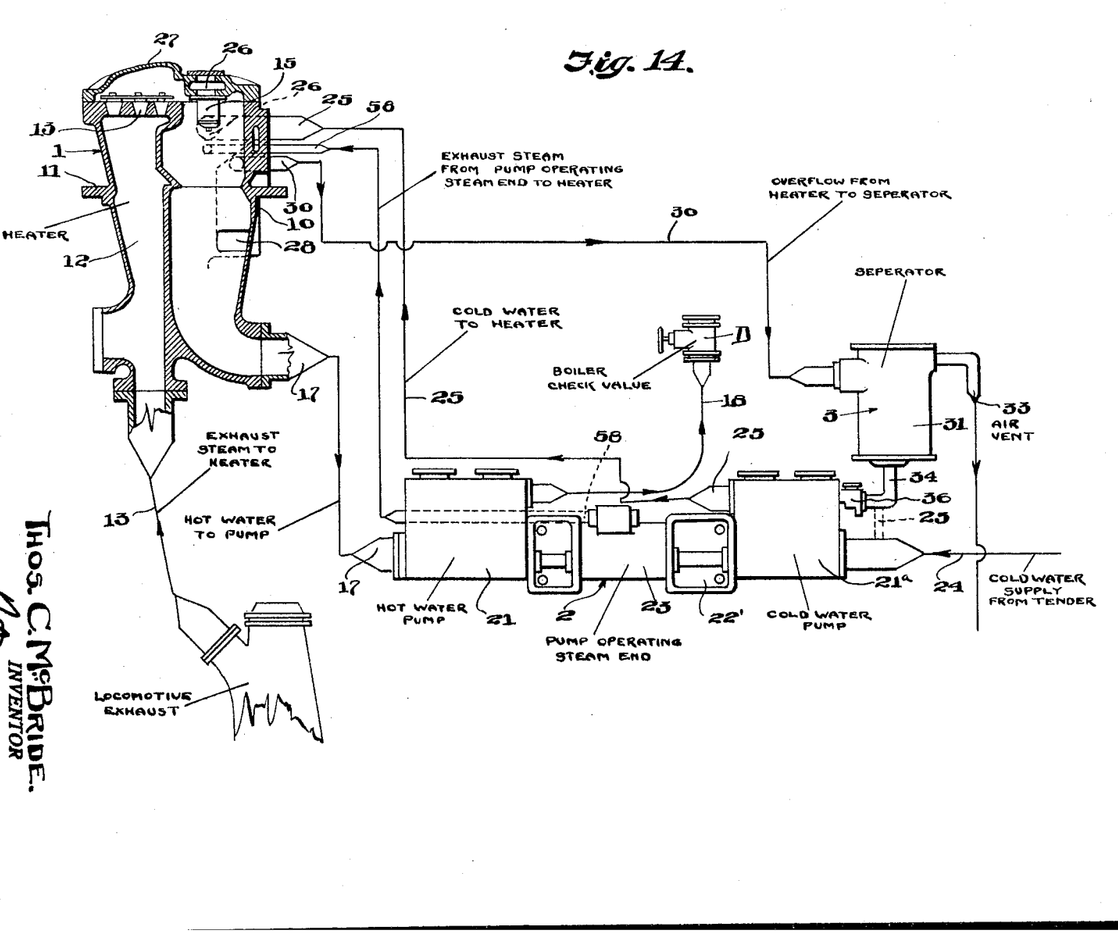
Figure 14 is a diagrammatic view showing the feed water heating system.

In Figs. 1 and 2 of the drawings, the pipes 25, 30 and 58 are shown as extending to the heater body 1 exteriorally or along the outside of the curvature of the smoke box "A" of the locomotive and thus are exposed or exhibited. In some instances where it is desirable to maintain as symmetrical an appearance of the locomotive as possible, it may be desired to hide the vertically rising portions of these pipes from view and such an arrangement is illustrated in Fig. 13 of the drawings where the smoke box "A" is provided with an indented channel 71 in which the pipes 25', 30' and 58' are seated. A cover plate 70 is mounted over the outer normally open side of the channel or trough 70. The outer surface of the cover plate 71 is preferably flush with the outer surface of the smoke box "A" thereby providing a smooth symmetrical surface uninterrupted by the pipes.

It will be understood that the invention is not to be limited to the specific construction or arrangement of parts shown but that they may be widely modified within the invention defined by the claims.

What is claimed is:

1. In a feed water heater for locomotives, the combination, of a heater, a pump for supplying water to the heater, and a separator for receiving overflow of excess water from the heater and having communication with said pump to return said excess water thereto and means within said separator for cutting off communication between the separator and pump at predetermined times.

2. In a feed water heater for locomotives, the combination, of a heater having hot water chamber, said heater having an overflow passage communicating with said hot water chamber, a separator for receiving excess water and air from said chamber through said overflow passage, said separator provided with a vent always open to atmosphere to permit escape of air from the separator, a pump for supplying cold water to the heater, a return valve on said pump, said separator delivering excess water to said pump through said return valve, and a float in said separator for controlling the delivery of water from the separator to the pump.

3. In a feed water heater for locomotives, the combination, of a heater, a pump for supplying water to the heater, a separator for receiving overflow of excess water from the heater and having communication with the pump to return said excess water thereto, and means for injecting a jet of cold water into the excess water during its passage to said separator.

4. In a feed water heater for locomotives, the combination of a heater having a hot water chamber, said heater having an overflow passage opening into the hot water chamber, a separator for receiving excess water and air from said chamber through said overflow passage, said separator provided with a vent always open to atmosphere to permit escape of air from said separator, and means for injecting a jet of water into the excess water and air during its passage to said separator.

5. In a feed water heater for locomotives, the combination, of a heater having a hot water chamber and an overflow passage therein, said passage opening into said chamber, a separator for receiving excess water and air from said chamber through said passage, a pump for delivering water to the heater, said separator delivering the excess water to said pump, and a nozzle having communication with the delivery passage of water to the heater and extending into the passage for excess water to the separator for injecting a jet of water into the excess water and air during the passage to said separator.

6. In a feed water heater, a heater body, a separator for receiving excess water and air from the heater body, a pump for delivering water to the heater, said separator connected to said pump to return the excess water to the pump, said pump having a suction valve and a return valve for controlling entrance of water into the pump, said return valve controlling entrance of said excess water into said pump, said return valve being under less tension and more responsive than said suction valve whereby the entrance of returned excess water into the pump will be favored.

7. In a feed water heater, the combination with a heater proper of a pump unit for delivering cold water to the heater body and withdrawing heated water therefrom, said pumping unit comprising a steam cylinder and hot and cold water pumps operated by said steam cylinder, said cold water pump provided with a bypass to permit leakage of a predetermined quantity of water pumped for properly proportioning the outputs of the cold water and hot water pumps at predetermined times.

8. In a feed water heater, the combination with a heater proper, of a pumping unit for delivering cold water to the heater body and withdrawing heated water therefrom, said pumping unit comprising a steam cylinder and hot and cold water pumps including reciprocating pistons operated by said steam cylinder, the piston of said cold water pump provided with a bypass opening to permit leakage past the piston of a predetermined quantity of water pumped for properly proportioning the outputs of the cold water and hot water pumps.

9. In a feed water heater, a heater body, a separator for receiving excess water and air from said heater body, a pumping unit for delivering cold water to the heater body and withdrawing heated water therefrom, said pumping unit comprising a steam cylinder and hot and cold water pumps operated by the steam cylinder, said cold water pump having a suction valve and a return valve for controlling entrance of water into the pump, said return valve controlling entrance of said excess water into the pump and being under less tension and more responsive than said suction valve whereby the entrance of returned excess water into the pump will be favored, said cold water pump provided with a bypass opening to permit leakage of a predetermined quantity of water pumped for properly proportioning the outputs of the cold water and hot water pumps at predetermined times.

10. In a feed water heater, a heater body, a separator for receiving excess water and air from said heater body, a pumping unit for delivering water to and withdrawing water from said heater body, said pumping unit comprising a steam cylinder and hot and cold water pumps including reciprocatory pistons operated by said steam cylinder, the piston of said cold water pump provided with a bypass opening to permit leakage past the piston of a predetermined quantity of water pumped for properly proportioning the outputs of the cold water and hot water pumps at predetermined times, said cold water pump having a suction valve and a return valve for controlling entrance of water into the pump, said return valve controlling entrance of said excess water into said pump.

11. In a feed water heater, a heater body, having a heating chamber therein, a pumping unit for delivering water to or withdrawing water from the heater body, a sprayer for spraying water to be heated into said heating chamber, said heater body provided with a passageway for delivering exhaust steam from said pumping unit to said heating chamber, said passageway opening into the heating chamber outwardly of the discharge of said sprayer, and means in the heater body for directing the pump exhaust steam in substantially a flat sheet against the spray of water.

12. In a feed water heater, a heater body having an exhaust steam inlet passage and a heating chamber therein, check valves between said passage and said chamber, a pumping unit for delivering water to or withdrawing water from the heater body, a sprayer for spraying water to be heated into said heating chamber, said heater body provided with a passageway opening into the heating chamber outwardly of the discharge of said sprayer and at a point remote from said check valves, and a partition in the heater body for directing the pump exhaust steam in substantially a flat sheet against the spray of water for condensing the pump exhaust steam and preventing its pressure from acting on said check valves.

THOMAS C. McBRIDE